UNITED STATES PATENT OFFICE.

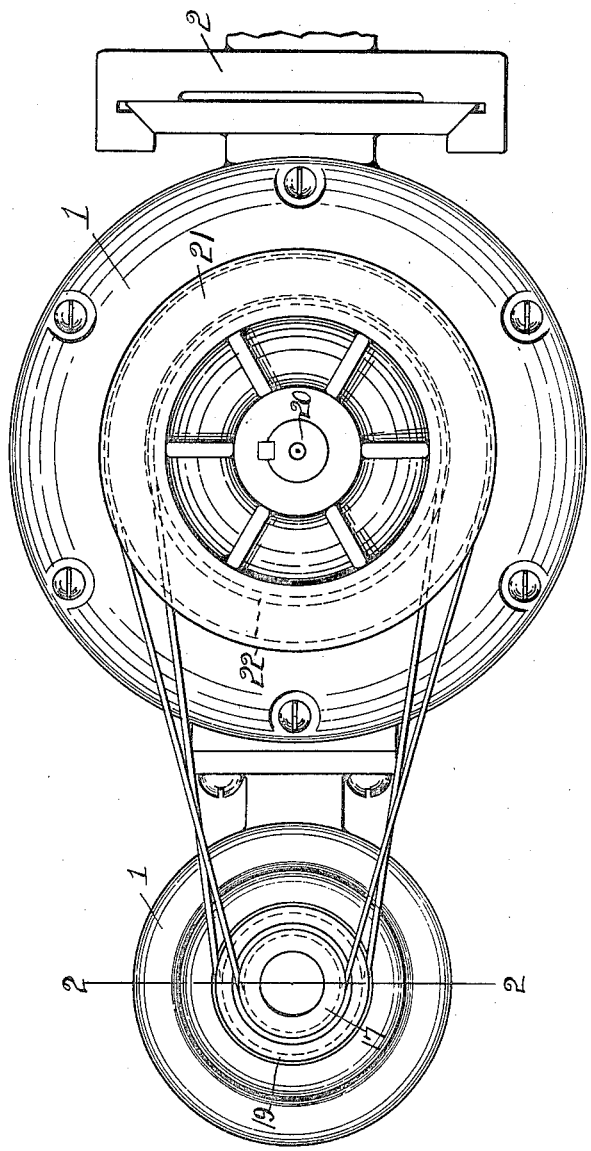

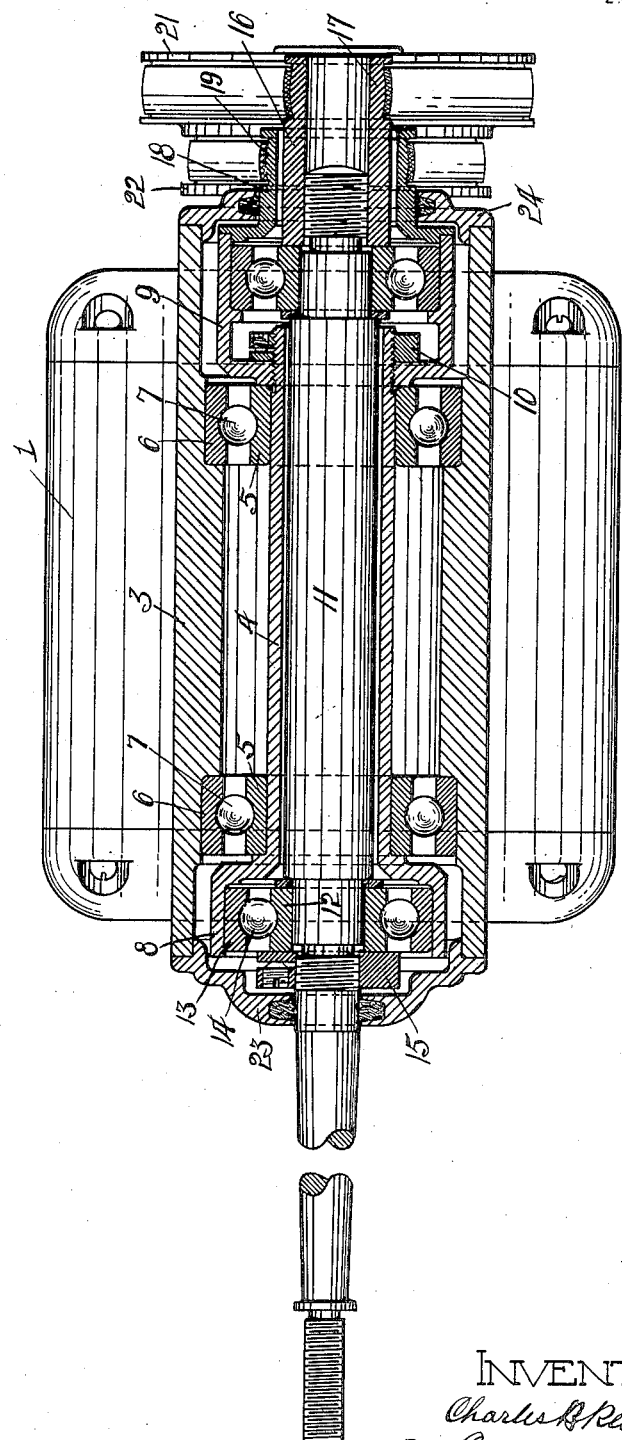

CHARLES B. REESE, OF TOLEDO, OHIO.

HIGH-SPEED BEARING.

1,402,794.     Specification of Letters Patent.     Patented Jan. 10, 1922.

Application filed September 15, 1920. Serial No. 410,361.

*To all whom it may concern:*

Be it known that I, CHARLES B. REESE, a citizen of the United States, and a resident of Toledo, Lucas County, Ohio, have made an Invention Appertaining to High-Speed Bearings; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to bearings of the type particularly adapted for high speed work.

One of the great difficulties in the use of high speed rotary members, such, for instance, as high speed tool shafts of lathes, is the wear to which the bearing balls and their races are subjected by reason of the relative slippage of the inner and outer races on the balls, which it is found in practice effects a rapid wearing of the bearing surfaces, and that the life of the bearing by reason of such slippage is proportionately shortened as the speed of rotation thereof increases.

The primary object of my invention is to provide a bearing so constructed as to entirely eliminate or reduce to a minimum the slippage between the parts thereof whereby to prolong the life of the bearing, enhance the commercial value thereof and minimize friction between the parts and the consequent heating thereof.

The invention is fully described in the following specification and while in its broader aspect it is capable of embodiment in numerous forms, a preferred embodiment thereof is illustrated in the accompanying drawings, in which, Figure 1 is an end elevation of an electric motor and high speed tool shaft connected therewith and embodying the invention, and Fig. 2 is a section on the line 2—2 in Fig. 1.

Referring to the drawings, 1 designates an electric motor carried by a bracket 2, which may constitute the tool carrying arm of a lathe. To one side of the motor casing is secured a tubular bearing housing 3 in which is rotatably mounted a sleeve 4. This sleeve is centered and mounted for free rotation in the housing in ball bearings, each of which comprises inner and outer ball races 5 and 6 respectively, and a set of balls 7, with the outer race 6 fixed to the housing and the inner race 5 fixed to the sleeve.

The sleeve 4 is provided at one end with a cylindrical enlargement 8 and at its other end with a cylindrical enlargement 9, the latter in the present instance being threaded to the sleeve 4 to facilitate a removal of the ball races 5 from the sleeve. The enlargement 9 is locked on the sleeve by a jam nut 10.

A high speed tool shaft 11 extends through the sleeve 4 and beyond the ends of the housing 3 and has a ball bearing in each sleeve enlargement 8 and 9, which bearing constitutes inner and outer races 12 and 13 and a set of interposed balls 14, with the outer race fixed to the sleeve enlargement and the inner race fixed to the shaft. The inner race 12 at one end is clamped to a shoulder or enlargement on the shaft by a nut 15 threaded on the shaft and the inner race at the opposite end of the shaft is clamped to the end of an enlargement thereon by a member 16, which is threaded on the shaft end and has its outer end extending axially beyond the shaft and forming a pulley 17.

The sleeve enlargement 9 has a reduced cylindrical extension 18 projecting from its outer end in surrounding concentric relation to the member 16 at the inner side of the pulley 17, free from contact therewith, however, and forms a pulley 19 which is larger than the pulley 17. The motor shaft 20 has two pulleys 21 and 22 of different sizes fixed to an end thereof, the larger pulley, 21 in the present instance, being belted to the pulley 17 and the smaller pulley 22, being belted to the pulley 19. The relative sizes of the pulleys 17 and 19 and 21 and 22 depends on the relative speed at which it is desired to drive the shaft 11 and bearing sleeve 4 to compensate for the difference so as to prevent any slippage of the balls 14 in contact with the races during a driving of the shaft. In the present instance, the speed of the bearing sleeve is approximately one-half of that of the shaft but in the same direction of rotation as the shaft. It is evident that the speed of driving of the bearing sleeve 4 may be so accurately proportioned with respect to the speed of driving of the shaft 11 that the slippage of the bearing can be entirely eliminated and the life of the bearings very materially prolonged and friction on the driven parts reduced to a minimum. It is evident, however, that while I have illustrated the speed of the bearing sleeve as being approximately one-half of that of the driven shaft, such relative difference in speed may be varied to suit the relative size or diameters of the inner and outer races of the bearings.

The housing 3 is closed at one end around the shaft 11 by an end plate 23 and at its other end around the sleeve extension 18 at the inner side of the pulley 10 by an end plate 24.

I wish it understood that my invention is not limited to any specific construction, arrangement or form of the parts as it is capable of embodiment in numerous forms without departing from the spirit of the claims.

Having thus described my invention what I claim as new and desire to secure by Letters Patent, is,—

1. In combination, a pair of driven members one disposed within the other for relative rotary movements, a bearing between said members comprising inner and outer races fixed respectively to the inner and outer members and a set of rolling bearing elements between the races, and means for driving the driven members at predetermined relatively different speeds to prevent or reduce slippage between the rolling bearing elements and races.

2. In combination, a driven shaft, a driven sleeve surrounding the shaft and mounted for rotary movements, a bearing within the sleeve for the shaft comprising inner and outer races fixed respectively to the shaft and sleeve, and a set of rolling elements between the races, and means for driving the sleeve and shaft at relatively different predetermined speeds.

3. In combination, a drive means, a driven sleeve mounted for rotary movements, a driven shaft mounted in the sleeve for rotation relative thereto, a ball bearing between the sleeve and shaft having its outer and inner races respectively fixed thereto to rotate therewith, and means connecting the drive means and both the shaft and sleeve for driving the shaft at one speed and the sleeve at a predetermined lesser speed to prevent slippage between the races and balls of the bearing.

4. In combination, a bearing having inner and outer races and a set of interposed rolling elements, and means for driving the two races at relatively different predetermined speeds to prevent slippage thereof on the elements.

In testimony whereof, I have hereunto signed my name to this specification.

CHARLES B. REESE